No. 763,788. PATENTED JUNE 28, 1904.
V. S. L. OWEN.
STEREOSCOPIC APPARATUS.
APPLICATION FILED MAY 13, 1903.
NO MODEL. 2 SHEETS—SHEET 1.
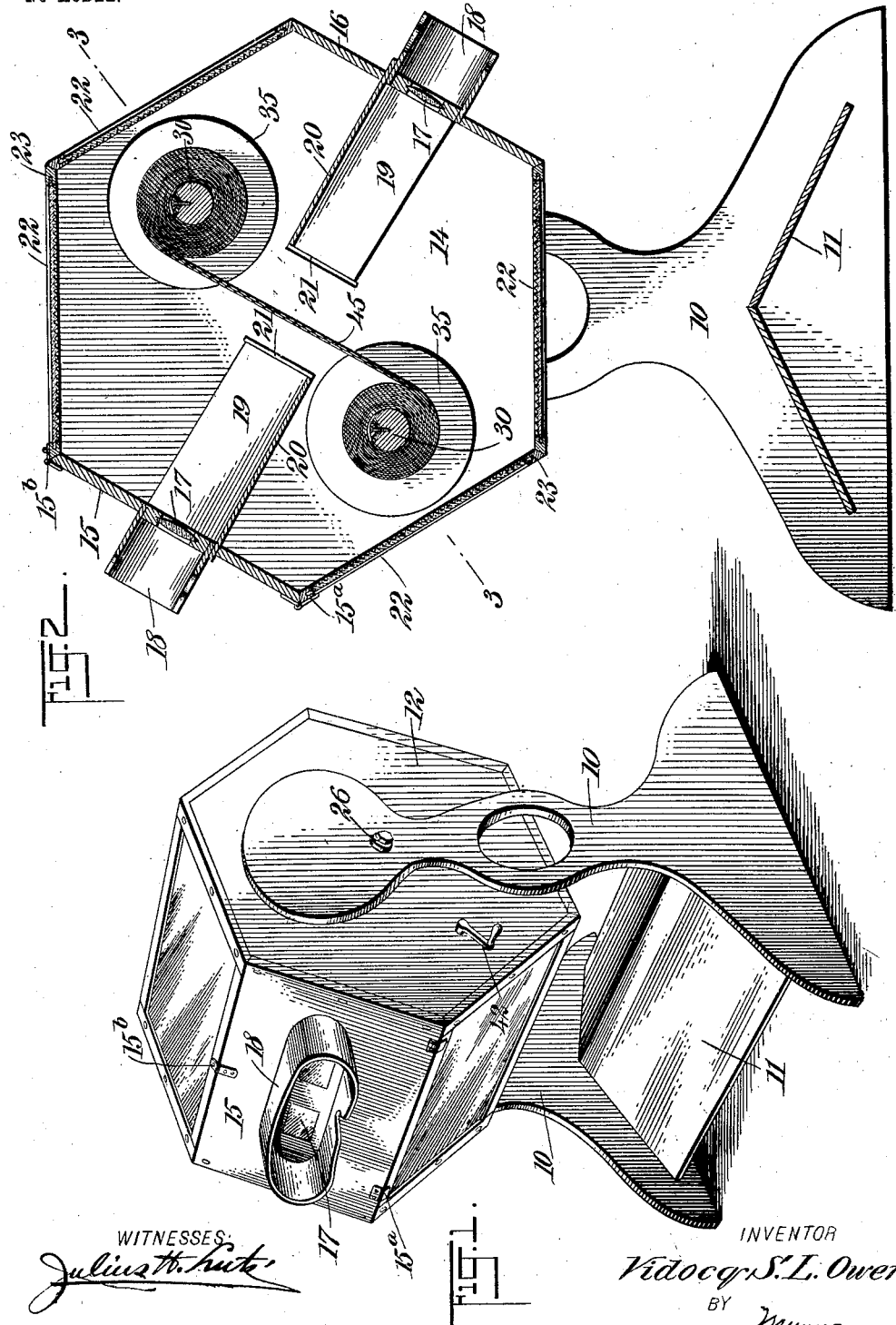
WITNESSES:
INVENTOR
Vidocq S. L. Owen
BY
ATTORNEYS.

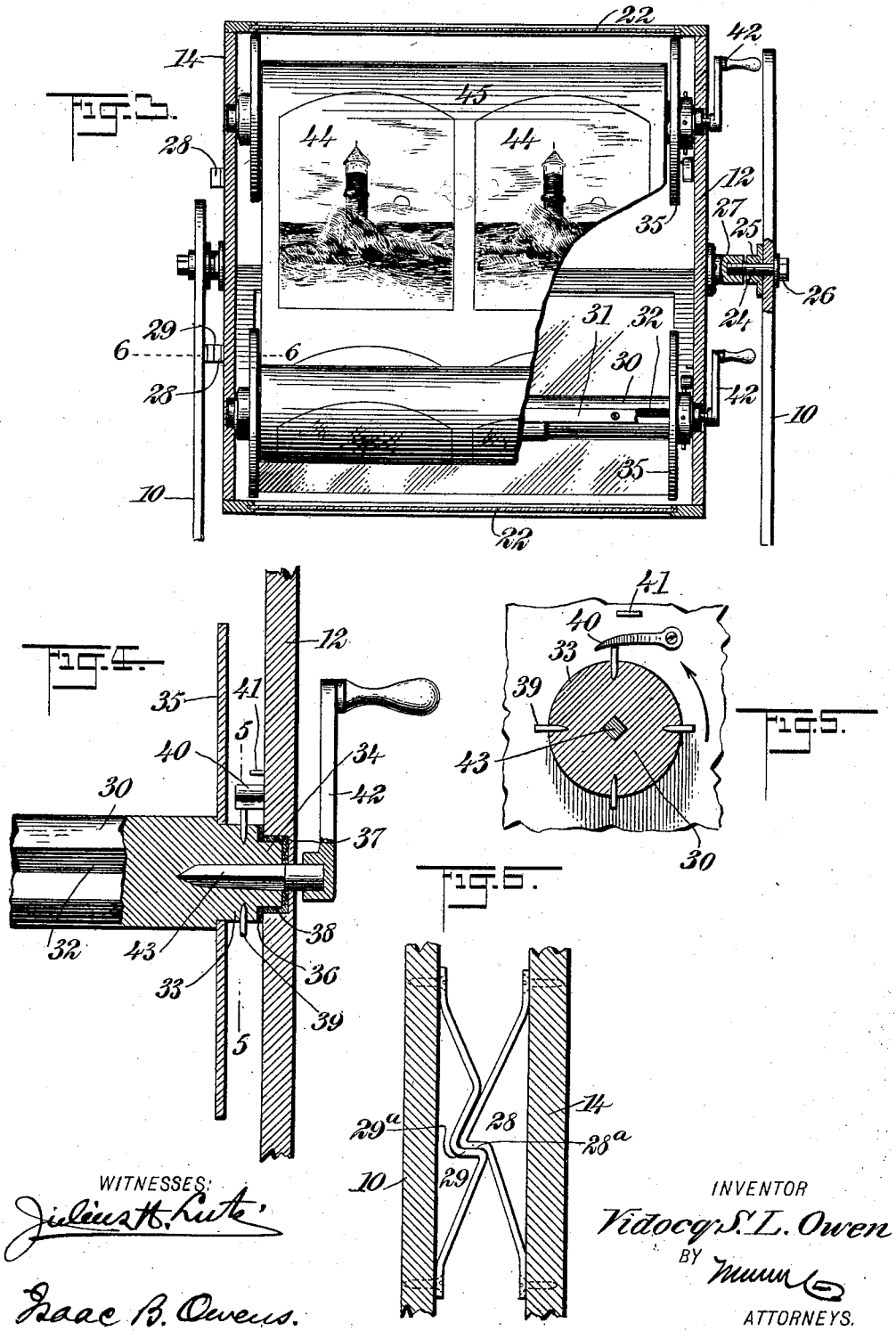

No. 763,788. Patented June 28, 1904.

UNITED STATES PATENT OFFICE.

VIDOCQ S. L. OWEN, OF ADRIAN, MINNESOTA.

STEREOSCOPIC APPARATUS.

SPECIFICATION forming part of Letters Patent No. 763,788, dated June 28, 1904.

Application filed May 13, 1903. Serial No. 156,936. (No model.)

*To all whom it may concern:*

Be it known that I, VIDOCQ S. L. OWEN, a citizen of the United States, and a resident of Adrian, in the county of Nobles and State of Minnesota, have invented a new and Improved Stereoscopic Apparatus, of which the following is a full, clear, and exact description.

The object of this invention is to provide means for displaying stereoscopic views more effectively, conveniently, and in greater number than heretofore. By means of the present invention the pictures may be instantaneously changed without the necessity of taking the eyes from the lenses, and therefore the strain and discomfort heretofore entailed in removing one picture and emplacing another is avoided. Also the stereoscopic pictures are effectively protected from abrasion and injury, and the number of pictures which may be shown from the apparatus is practically limitless.

The invention comprises a case which is mounted to assume either one of two positions and which contains a pair of rollers provided with means reaching to the exterior of the case by which the rollers may be turned at will. On said rollers are wound the stereoscopic pictures, which are arranged in a continuous web and at each side of the same. In opposite sides of the case the usual stereoscopic lenses and their appurtenances are arranged, and by reversing the case either side of the strip of pictures may be placed upward, so that a person may view the entire series of pictures on one side of the web of pictures and then by reversing the case view the pictures on the opposite side.

The invention involves various other features of more or less importance, all of which will be fully pointed out hereinafter.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a perspective of the apparatus. Fig. 2 is a vertical section thereof. Fig. 3 is a section on the line 3 3 of Fig. 2. Fig. 4 is an enlarged detail showing the manner of mounting one of the rollers. Fig. 5 is a detail section on the line 5 5 of Fig. 4, and Fig. 6 is a detail showing the bottom or active stop and the keeper for holding the case in either one of its two adjustments and for preventing back movement thereof, this view being a horizontal section on the line 6 6 of Fig. 3.

The base of the apparatus comprises two side frames 10, having a connecting member or members 11. These parts may be of any desired material.

The case comprises end walls 12 and 14 and is preferably hexagonal in cross-section, as best shown in Fig. 2. Two of its opposite faces 15 and 16 are fitted with stereoscopic lenses 17 and their appurtenant parts—viz., the hoods 18, partitions 19, bottom ledges 20, and middle screens 21, all of which may be of any approved construction. The remaining four faces of the hexagonal case are provided with prismatic glass plates 22, held in suitable frames 25, which are in turn screwed or otherwise fastened in position, these glass plates 22 allowing ample light to enter the case, but at the same time completely closing the same and preventing any tampering with the interior parts. One of the walls of the case—for example, the wall 15—may be hinged, as indicated at $15^a$, and provided with a catch $15^b$, so as to facilitate access to the interior of the case for the purpose of emplacing and changing the pictures. The case is mounted to turn between the side frames 10 of the base, and according to the construction here shown this is effected by means of journals 24, turning in sleeves 25, fastened to the inner sides of the side frames 10, said journals having heads 26 at their outer ends and having their inner ends screwed or otherwise fastened in sleeves or thimbles 27, secured to the side walls 12 and 14 of the rockable case. This construction mounts the case so that it may be turned around its horizontal axis. For the purpose of holding the case yieldingly yet securely in either one of its two positions and for preventing the case from being turned backward I provide two dogs 28, fastened, preferably, to the end wall 14 of the case and coacting with a keeper 29, fastened to the adjacent side frame 10. The dogs 28 are so positioned on the case that when said case is in the position shown in Fig. 2 one dog will be engaged with the keeper 29, and then when the case is given a half-revolution, so as to place the face 16 in the position occupied by the face 15, the other dog will strike the keeper and become engaged therewith. Said dog has a shoulder 28$^a$, as best shown in Fig. 6, and leading to this shoulder is an inclined surface, these parts coacting with a corresponding depression 29$^a$ in the keeper. The parts 28 and 29 not only serve to hold the case from idle movement, but they also have a clutching action to prevent the back rotation of the case and are so disposed as to hold the case from being pushed backward by the pressure of the user's forehead on the uppermost hood 18.

Within the case are two rollers 30, which carry, respectively, the ends of the apron or web carrying the stereoscopic pictures, these ends being fastened to the rolls in any desired manner—for example, by means of cleats 31, which are secured in grooves 32, formed in the roller. Each end of each roller is formed with two reductions 33 and 34. On the reductions 33 are placed and secured centrally-orificed disks 35, forming the end flanges of the rolls, and on the reductions 34 are placed disks 36, of felt or the like, which are arranged to bear up against the shoulder formed by the reduction 34. Formed in or fastened to the interior faces of the side walls 12 and 14 are sockets or socket-pieces 37, and in said sockets are placed the eccentrics of the rollers, which form journals therefor, such journals being shaped by the before-described reductions 34. This socket or socket-piece 37, as the case may be, is lined with felt or the like, as indicated at 38. It will thus be seen that the rollers are mounted so as to turn around their axes, so that this turning movement is retarded by the felt 36 and 38, and also that such felt insures absolute noiselessness in the operation of the parts. On one end of each roller just outward from the adjacent disk 35 are arranged a series of teeth 39, and with each series of teeth a dog 40 operates, said dogs being mounted to swing on the adjacent side wall of the case and having stops 41 to limit their movement away from the respective rollers. Said dogs are located at the opposing sides of the rollers— that is to say, directly opposite each other— and therefore one dog is always active and the other dog always inactive. This is indicated in Fig. 3, where it will be seen that the uppermost dog will always fall by gravity away from its corresponding roller, while the lower dog will always fall by gravity upon its corresponding roller. Since the movement of the apron or web carrying the pictures is reversed upon the reversal of the case, this automatic shifting of the dogs is essential to the operation of the machine, as will be fully set forth hereinafter. At one side of the case, preferably the side 12, are located the cranks 42 for operating the rolls 30, said cranks being of any desired construction and having their spindles 43 firmly secured in the adjacent ends of the rolls and said spindles being rounded beyond the rolls and projected to the outer side of the case through openings in the sockets 37, as shown best in Fig. 4. In connection with the crank-handles 42 it will be observed that in order to allow these handles to clear the adjacent side frame 10 the bearing devices for the case at this side thereof must be sufficiently extended to allow room for the handle to pass through. This is illustrated in Fig. 3.

The stereoscopic pictures are indicated at 44. These pictures are applied to a web or apron 45, and in order to increase the capacity of the machine they are arranged on each side thereof, so that by reversing the position of the case, as before explained, either side of the apron may be viewed. This apron may be constructed in various manners; but it is preferable in the case of photographs to produce the pictures directly upon photographic paper and then cement these sheets of paper back to back. In this form of the apron the photographic paper forms not only the pictures, but the web or apron which carries them. In case this construction is employed the photographic paper should of course be in continuous length equal to the entire length of the apron.

The use and advantages of the invention will, it is thought, be readily understood. The web bearing the pictures is wound oppositely over the rollers, its ends being attached one to each roller. Assuming that the stereoscopic devices proper are in order after the desired side of the apron of pictures has been selected, it is only necessary to rotate one of the rollers, whereby to draw from the other roller onto the roller which is being rotated. The friction which is incident to the movement of the rollers prevents them from idle movement and maintains the pictures at the proper tension. The lower roll should always be employed as the winding-roll, and in order to prevent confusion in this respect the adjacent side frame 10 has been constructed so as to cover the crank-handle 42 of the roller which may be uppermost, thus making it inconvenient, at least, for the upper roller to be revolved by its crank-handle. This is shown best in Fig. 1. After one side of the apron of pictures has been examined the other side may be examined by simply giving the case a half-revolution, so that the stereoscopic devices which are shown in Fig. 2 as occupying the lower side will occupy the opposite or upper side. Then the above-described operation may be repeated.

Various changes in the form, proportions, and minor details of the invention may be resorted to at will without departing from the spirit and scope thereof. Hence I consider myself entitled to all such variations as may lie within the intent of my claims.

Having thus described my invention, I claim as new and desire to secure by Letters Patent—

1. A stereoscopic apparatus, comprising a frame, a rotatable case mounted therein, stereoscopic devices placed in opposite sides of the case, means for holding pictures between said stereoscopic devices, and devices for removably holding the case in either of two positions, said devices comprising two dogs on the case and a keeper mounted on the frame and adapted to be engaged by either dog.

2. The combination of a case, a roller having two reductions at each end, a centrally-orificed disk placed on each inner reduction to form flanges for the rollers, the outer reductions being mounted in the case to permit the roller to revolve, and a crank-handle having its spindle passed loosely through the case and fastened to the roller.

3. The combination of a frame, a case mounted to turn therein and having observation-openings at opposite sides, two rollers mounted in the case, and an apron having its end portions wound over the rollers, the sides of the apron being respectively visible through the said observation-openings, and the turning of the case placing either of the observation-openings in upper position.

4. The combination of a frame, a case mounted to turn therein, and having observation-openings at opposite sides, two rollers mounted in the case, an apron having its end portions wound over the rollers, the sides of the apron being respectively visible through the said observation-openings, and the turning of the case placing either of the observation-openings in upper position, and devices for removably holding the case in either of two positions, for the purpose specified.

5. The combination of a frame, a case mounted to turn therein and having observation-openings at opposite sides, two rollers mounted in the case, an apron having its end portions wound over the rollers, the sides of the apron being respectively visible through the said observation-openings, and the turning of the case placing either of the observation-openings in upper position, and devices for removably holding the case in either of two positions, for the purpose specified, said devices comprising a keeper mounted on the base and two dogs mounted on the case, either of said dogs being capable of engaging the keeper.

6. The combination of a frame, a case mounted to turn thereon and having observation-openings therein, devices mounted in the case and adapted to be viewed through the observation-openings, a keeper and dogs mounted respectively on the frame and case, the keepers and dogs having oppositely-disposed shoulders thereon and being formed of spring material to permit the continuous revolution of the case in one direction and to prevent revolution of the case in the opposite direction, for the purpose specified, said keepers and dogs being adapted upon engagement to hold the case in any one of a plurality of positions.

7. The combination of a frame, a case mounted to turn therein, rollers mounted in the case, an apron wound over the rollers, and operating devices for the rollers, said devices extending to the outside of the case, the frame having a portion capable of covering certain of the operating devices according to the position to which the case is turned.

8. The combination of a frame, a case mounted to turn therein, rollers mounted in the case, an apron wound over the rollers, operating devices for the rollers, said devices extending to the outside of the case, the frame having a portion capable of covering certain of the operating devices according to the position to which the case is turned, and devices for removably holding the case in any one of said positions.

In testimony whereof I have signed my name to this specification in the presence of two subscribing witnesses.

VIDOCQ S. L. OWEN.

Witnesses:
CHARLES W. KILPATRICK,
A. G. LINDGREN.